United States Patent [19]
Hill

[11] 3,846,692
[45] Nov. 5, 1974

[54] PEAK AMPLITUDE FOLLOWER CIRCUIT
[75] Inventor: Anthony Hill, Wildwood, England
[73] Assignee: The General Electric Company Limited, London, England
[22] Filed: Nov. 14, 1973
[21] Appl. No.: 415,676

[30] Foreign Application Priority Data
Nov. 20, 1972 Great Britain............ 53475/72

[52] U.S. Cl............ 321/8 R, 307/235 A, 321/10, 324/103 P, 324/119, 328/26, 328/150
[51] Int. Cl........... H02m 7/02, G01r 19/04
[58] Field of Search......... 321/8, 10; 333/79; 324/103 P, 119; 328/26, 150; 307/235 A

[56] References Cited
UNITED STATES PATENTS

| | | | |
|---|---|---|---|
| 2,456,638 | 12/1948 | Kenyon | 321/10 |
| 2,834,933 | 5/1958 | Rich | 328/150 |
| 3,237,023 | 2/1966 | Wilhelm | 307/235 A |
| 3,238,383 | 3/1966 | Falk | 321/8 R |
| 3,760,255 | 9/1973 | Grodinsky | 321/8 R |
| 3,783,379 | 1/1974 | Nestorovic | 324/103 P |

Primary Examiner—William H. Beha, Jr.
Attorney, Agent, or Firm—Kirschstein, Kirschstein, Ottinger & Frank

[57] ABSTRACT

A circuit is provided for producing a d.c. output signal which follows variations in the peak value of an alternating input signal in which the input signal is rectified and applied to a capacitor. A reference signal is derived from the voltage across the capacitor and is compared to the rectified signal to produce a control signal for controlling an operational amplifier, the output from the operational amplifier acting to reduce the charge on the capacitor when the peak value of the input signal falls.

16 Claims, 6 Drawing Figures

PEAK AMPLITUDE FOLLOWER CIRCUIT

This invention relates to an electrical circuit for producing a d.c. output signal which follows variations in the peak value of an alternating input signal.

In a known circuit for producing a d.c. output signal which is representative of the peak value of an alternating input signal, the input signal is rectified and the rectified signal is applied to a storage capacitor. The charge on the storage capacitor, therefore has a maximum value corresponding to the peak value of the rectified signal and therefore of the input signal. However, the capacitor tends to discharge when the instantaneous value of the rectified signal drops below the peak value and therefore the output signal, which is taken from the voltage across the storage capacitor, varies with the instantaneous value of the rectified signal. To overcome this difficulty, a diode is connected in series between the storage capacitor and the source of the rectified signal and isolating means, for example a buffer amplifier, is connected between the storage capacitor and the output. This circuit will produce a d.c. output signal which is representative of the peak value of an alternating input signal and which will follow increases in said peak value. However, due to the effects of the diode and the isolating means, the output will remain steady when there is a decrease in the peak value of the input signal.

It is an object of the present invention to provide a circuit which overcomes these difficulties.

According to the invention, an electrical circuit for producing d.c. output signal which follows variations in the peak value of an alternating input signal comprises input terminals to which the alternating signal is applied, a rectifier for producing a rectified signal from the input signal, a storage capacitor which is connected to the rectifier output so as to be charged to a value corresponding to the peak value of the rectified signal, output terminals across which the d.c. output is produced, means for deriving a d.c. reference signal from the voltage across the capacitor, means for comparing the reference signal with the rectified signal to produce a control signal in response to variations, from a predetermined value, of the difference between the reference signal and the peak value of the rectified signal, due to falls in said peak value, and means controlled by said control signal for discharging the capacitor until said predetermined value of said difference is restored.

The invention will be more readily understood from the following description of preferred embodiments taken in conjunction with the accompanying drawings, in which.

Figure 1:
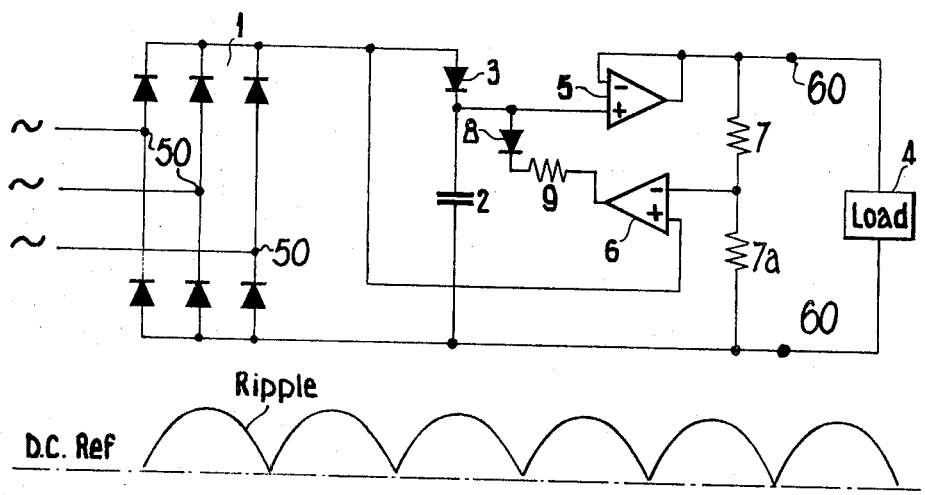
FIG. 1 is a diagram of a circuit for deriving a d.c. signal that closely follows the peak value of a three phase input signal.

Referring to FIG. 1, an alternating input signal is applied to the input terminals (50) of a three phase rectifier 1 to produce a positive rectified signal. A storage capacitor 2 and a diode 3 are connected in series between the positive and negative outputs of the rectifier so that the storage capacitor 2 is charged through the diode 3. A buffer amplifier 5 has its input connected to the junction point of the storage capacitor 2 and the diode 3 and its output connected to a load 4. The other side of the load is connected to the common line. An operational amplifier 6 has non-inverting and inverting inputs connected respectively to the junction point of the rectifier 1 and the diode 3 and the mid-point of a potential divider formed by a pair of resistors 7, 7a connected across output terminals 60 to which a load 4 is connected. The output of the amplifier 6 is connected to the junction point of the diode 3 and the input to the amplifier 5 through a resistor 9 and a diode 8.

The output from the rectifier 1 charges the storage capacitor 2 through the diode 3. In a known circuit, i.e., in the absence of the operational amplifier 6, the resistors 7, 7a, the resistor 9 and the diode 8, the voltage across the storage capacitor 2 closely follows increases in the peak value of the input signal but is prevented from following decreases by the diode 3 and the buffer amplifier 5. The amplifier 5 has a high input impedance and a low output impedance and serves to isolate the load 4 from the storage capacitor 2. A smoothed d.c. signal which follows increases in the peak value of the input signal is thus derived for application to the load as an output signal.

To enable the output signal to follow decreases in the peak value of the supply, the unsmoothed signal from the rectifier 1 is compared to a d.c. reference signal, obtained from the smoothed signal by the potential divider 7, 7a, by the operational amplifier 6. When the peak value of the input signal is steady, the unsmoothed signal from the rectifier 1 always has a higher value than the d.c. reference set by the potential divider 7, 7a as shown by the waveform diagram in FIG. 1. Under these conditions, the output of the amplifier 6, which acts as a control signal for the capacitor discharge means formed by the diode 8 and the resistor 9, is a positive voltage and hence the diode 8 is reverse biased preventing discharge of the capacitor 2. A decrease in the peak value of the input signal results in a decrease in the level of the unsmoothed signal. When the troughs in the ripple fall below the d.c. reference level the amplifier 6 changes state, its output going negative. The diode 8 conducts, drawing current from the capacitor 2 via the resistor 9 until the d.c. reference level falls to just below the troughs in the ripple again.

Figure 2:
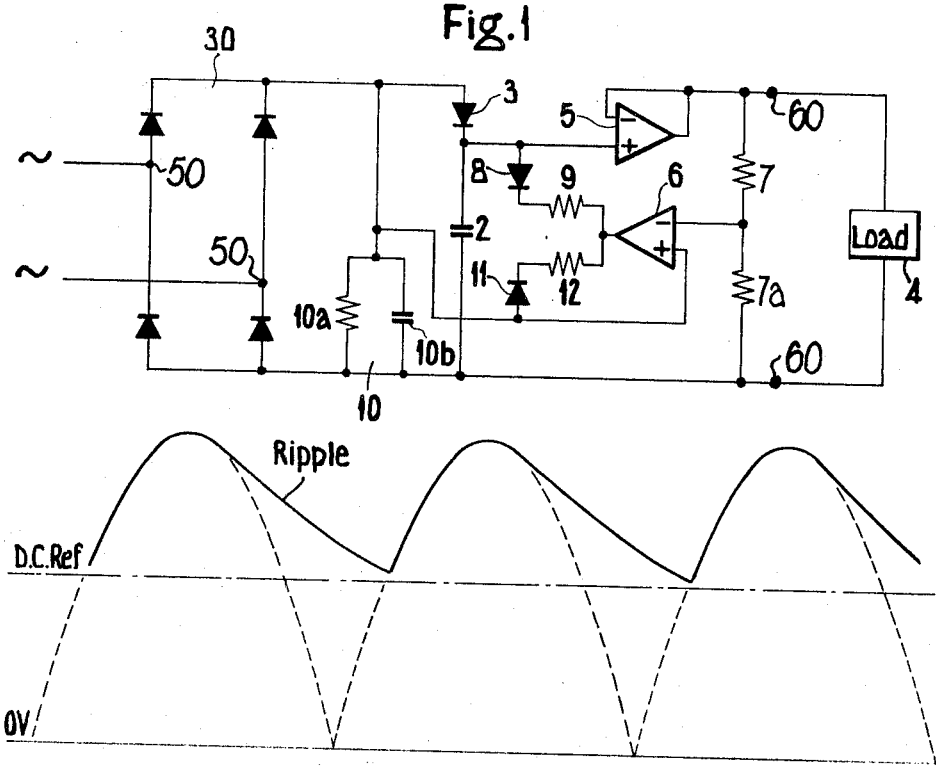
FIG. 2 is a diagram of a corresponding circuit for a single phase input signal.

Referring now to FIG. 2, which shows a corresponding circuit for a single phase input signal, a full wave rectifier 30 and a rough smoothing circuit 10, formed of a resistor 10a and a capacitor 10b, produce a d.c. signal having an a.c. ripple superposed on it as shown in the waveform diagram of FIG. 2. The remainder of the circuit is the same as, and operates in the same way as, the circuit of FIG. 1 except that as the maximum rate of discharge of the storage capacitor 2 is limited by the time constant of the rough smoothing circuit 10, it is necessary to discharge the capacitor 10b rapidly. This is done by connecting a diode 11 and a resistor 12 between the junction point of the resistor 10a, the capacitor 10b and the positive rectifier output, and the output of the amplifier 6.

The circuits shown in FIGS. 1 and 2 have the disadvantage that a spike appearing on the input signal charges the storage capacitor 2 to the spike peak value, which results in a spurious increase in the d.c. output signal.

Figure 3:
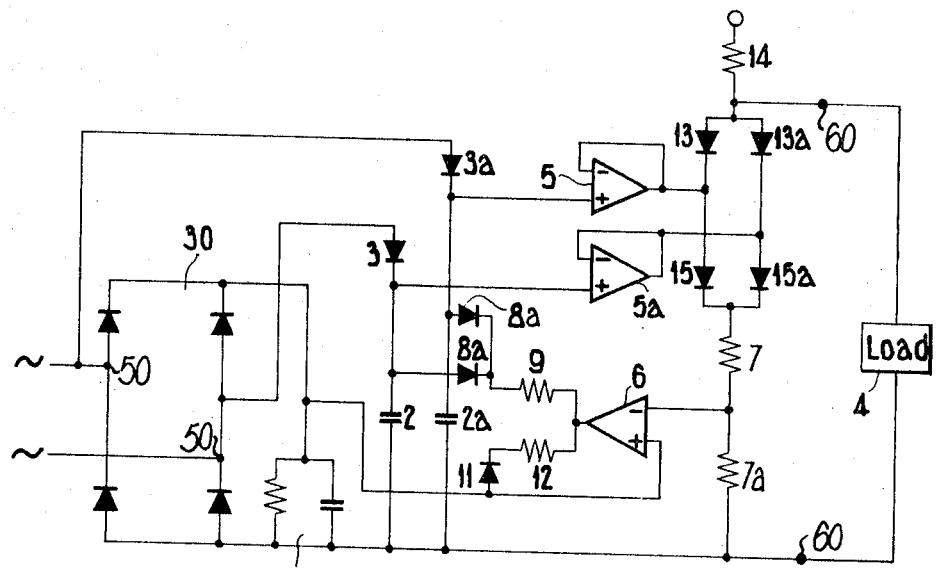
FIG. 3 shows a circuit based on the circuit of FIG. 2 but with means for preventing false output caused by spikes or impulses on the input signal.

This problem for a single phase input signal is overcome by the circuit shown in FIG. 3. In this circuit, two storage capacitors 2 and 2a are charged to the peak value of the positive and negative half cycles respectively via diodes 3 and 3a. The capacitors 2, 2a are connected to separate buffer amplifiers 5 and 5a and the outputs from the amplifiers 5 and 5a are connected to a gating circuit formed by diodes 13 and 13a and a resistor 14 which selects the lowest stored voltage for the output. A spike on the input signal thus charges one of the storage capacitors 2, 2a to a higher voltage level, but the gating circuit selects for the output the original lower voltage stored in the other capacitor. Two further diodes 15, 15a are connected between the diodes 13, 13a and the potential divider 7 so that the higher stored voltage is connected to the inverting input of the amplifier 6 to initiate discharge of the capacitor charged to the higher voltage. Operation of this part of the circuit is the same as previously described except that a further diode 8a is required. The arrangement shown in FIG. 3 could also be used in the circuit of FIG. 1.

Figure 4:
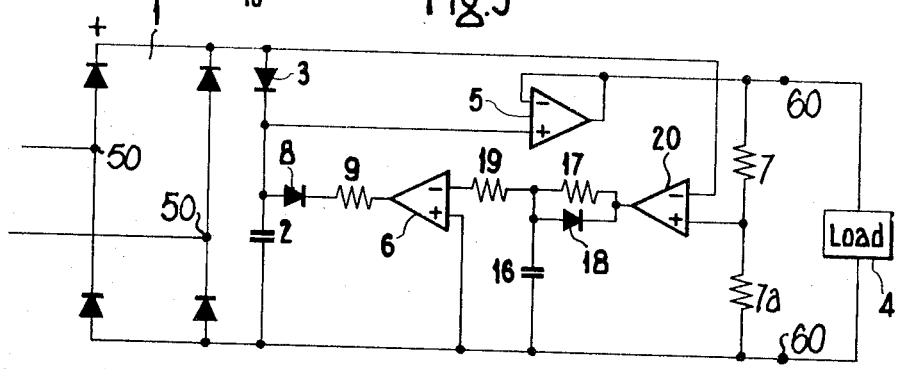
FIG. 4 shows a circuit based on FIG. 2 but with an alternative reset circuit.
Figure 4:
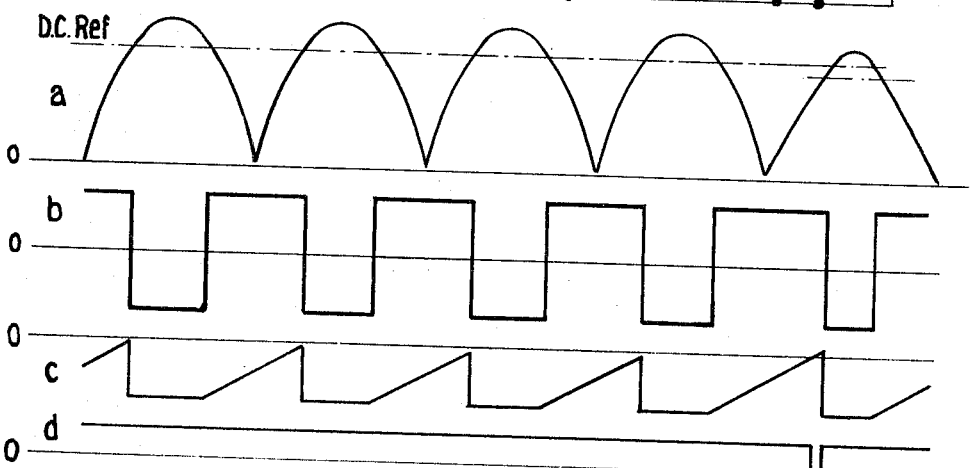

FIG. 4 shows a circuit similar to that of FIG. 2 but embodying a different arrangement for discharging the storage capacitor. The rough smoothing circuit 10 is no longer necessary but an additional capacitor 16, additional resistors 17 and 19, an additional diode 18 and an additional operational amplifier comparator 20 are required. The amplifier 20 has inverting and non-inverting inputs connected respectively to the positive output side of the rectifier 1 and the junction point of the resistors 7 and 7a and its output connected to an integrating circuit consisting of the resistor 17 and the capacitor 16. The resistor 19 is connected to the inverting input of the operational amplifier 6 in series with the resistor 17. The diode 18 is connected in parallel with the resistor 17. The non-inverting input of the amplifier 6 is connected to the other side of the rectifier 1. The operation of the discharge arrangement of the circuit will be explained with reference to the waveform diagrams in FIG. 4. The amplifier 20 compares the unsmoothed full wave rectified signal with the reference potential set by the potential divider 7, 7a as shown by waveform (a). The resulting output from the amplifier 20 is a series of positive and negative going pulses as shown by waveform (b). The capacitor 16 of the integrating circuit charges via the resistor 17 during a positive pulse and discharges through the diode 18 during a negative pulse. The peak voltage attained by the capacitor 16 as shown in waveform (c) is indicative of the duration of a positive pulse and is therefore indicative of the ratio of the peak value of the output from the rectifier 1 to the d.c. reference signal. If the input signal, and hence the unsmoothed output from the rectifier 1, falls, the length of the positive pulse increases and the charge on the capacitor 16 rises above 0 volts. The amplifier 6 momentarily changes state as shown by the waveform (d) causing the discharge of the capacitor 2 and hence a reduction in the reference potential until balance is once again restored. The arrangement shown in FIG. 4 could also be used in the circuit of FIG. 3.

Figure 5:
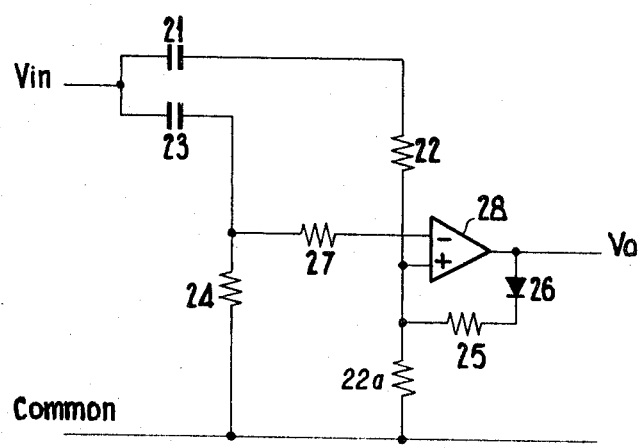
FIG. 5 is a circuit diagram of a comparator for producing two expontial signals from the outputs of the circuits of FIGS. 1 to 4 and for comparing said signals and FIG. 6 shows graphically the operating sequence of the circuit of FIG. 5.

One particular application of the circuits of FIGS. 1 to 4 is used in conjunction with the circuit shown in FIG. 5 which gives a response to incremental changes in the level of the d.c. signal produced by the circuits of FIGS. 1 to 4. In FIG. 5, a capacitor 21 and two series connected resistors 22 and 22a form a first differentiating circuit and a capacitor 23 and a resistor 24 form a second differentiating circuit in parallel with the first differentiating circuit. An operational amplifier 28 has its inverting input connected to the junction point of the capacitor 23 and the resistor 24 through a resistor 27 and its non-inverting input connected to the junction point of the resistors 22 and 22a. The purpose of the resistor 27 is to increase the input impedance of the amplifier 28 so that it does not affect the time constants of the differentiating circuits.

The capacitors 21 and 23 will be charged to the quiescent value of the d.c. input signal Vin. When there is a sudden increase in the value of this signal, a voltage V1 is produced across the resistors 22, 22a and a voltage V2 is produced across the resistor 24. These voltages start from the same initial value but decay at differing rates as the capacitors 21 and 23 charge to the new levels as shown by the curves A and B in FIG. 6.

Figure 6:
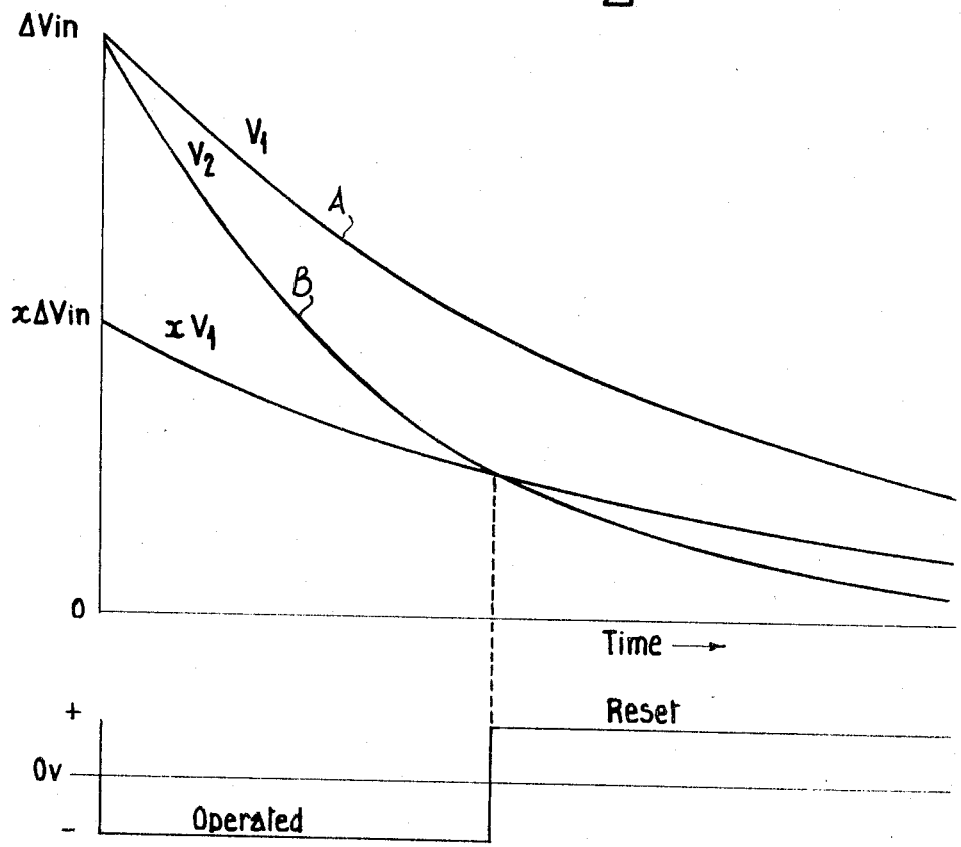

The amplifier 28 compares the voltage V2 on its inverting input with a fraction ($x$) of the Voltage V1, set by the potential divider 22, 22a, on its non-inverting input. The output $V_0$ of the amplifier 28 is positive unless the voltage on its inverting input is more positive than the voltage on its non-inverting input. Referring to FIG. 6, it can be seen that immediately after an increase in the input signal, V2 is greater than xV1 and therefore the output of the amplifier 28 changes to a negative voltage. The amplifier 28 remains in this state until V2 equals xV1 at which time it resets, the output becoming positive again.

The time for which the amplifier remains operated, i.e. produces a negative output voltage, depends on the time constants of the differentiating circuits 21, 22, 22a and 23, 24 and the fraction $x$. It is thus independent of the magnitude of the change in the input voltage. Also, a subsequent reduction in the input voltage will cause the amplifier 28 to reset even though the normal operational period of the amplifier has not elapsed.

The amplifier 28 can be given a bias so that the increase in the input signal has to exceed a predetermined value before the amplifier changes to the operative state. This bias is produced by means of a resistor 25 and a diode 26 connected in series between the non-inverting input and the output of the amplifier 28. When the amplifier is in the reset state, the output Vo is positive and current flows through the resistors 25 and 22a. The increase in the input voltage has to exceed the resulting bias voltage across the resistor 22a before the amplifier 28 will change state. When the amplifier 28 does change state, the negative output voltage causes the diode to become reverse biassed. The initial bias voltage is thus removed allowing the amplifier 28 to operate as described above.

I claim:

1. An electrical circuit for producing a d.c. output signal which follows variations in the peak value of an alternating input signal comprising input terminals to which the alternating signal is applied, a rectifier for producing a rectified signal from the input signal, a storage capacitor which is connected to the rectifier output so as to be charged to a value corresponding to the peak value of the rectified signal, output terminals across which the d.c. output is produced, means for deriving a d.c. reference signal from the voltage across the capacitor, means for comparing the reference signal with the rectified signal to produce a control signal in response to variations, from a predetermined value, of the difference between the reference signal and the peak value of the rectified signal, due to falls in said peak value, and means controlled by said control signal for discharging the capacitor until said predetermined value of said difference is restored.

2. An electrical circuit according to claim 1, in which the reference signal producing means comprises a potential divider connected across the output terminals.

3. An electrical circuit according to claim 1 in which the control signal producing means comprises an operational amplifier having the rectified signal and the reference signal connected to its inputs and the capacitor discharge means connected to its output.

4. An electrical circuit according to claim 1 in which the control signal producing means comprises a first operational amplifier having the rectified signal and the reference signal connected to its inputs, an integrating circuit connected to the output of the first operational amplifier, a diode connected in parallel with the resistor of the integrating circuit and a second operational amplifier having its input connected across the integrating circuit output and its output connected to the capacitor discharge means.

5. An electrical circuit according to claim 3 in which the capacitor discharge means comprises a diode and a resistor connected in series between the storage capacitor and said operational amplifier output.

6. An electrical circuit according to claim 1 including means for preventing input signal voltage spikes from appearing on the output signal.

7. An electrical circuit according to claim 6 in which the spike preventing means comprises a pair of storage capacitors which are charged respectively to the peak values of the positive and negative half cycles of the input signal, a gating circuit for selecting the lower of the two voltages on the storage capacitors as the d.c. output signal and means for transferring the higher of the two voltages to the reference signal producing means.

8. An electrical circuit according to claim 1 in which the rectifier is a 3-phase rectifier.

9. An electrical circuit according to claim 1 in which the rectifier is a single phase rectifier.

10. An electrical circuit according to claim 1 in which a diode is connected between the rectifier output and the or each capacitor to prevent discharge thereof.

11. An electrical circuit according to claim 7 in which a diode is connected between the rectifier output and each capacitor to prevent discharge thereof.

12. An electrical circuit according to claim 1 in which a buffer amplifier is connected to isolate the output terminals from the capacitor.

13. An electrical circuit for connection to the output of the circuit of claim 1 and for giving a response to incremental changes in the d.c. output signal produced thereby, comprising a pair of input terminals, means responsive to a change in the input signal for producing first and second voltages, said second voltage having a value equal to a fraction of the other and decaying at a slower rate and an operational amplifier having its inputs connected to receive said voltages so as to be in a first or second state according to whether said first voltages is greater than or less than said second voltage.

14. An electrical circuit according to claim 13 in which the voltage producing means comprise first and second differentiating circuits.

15. An electrical circuit according to claim 14 in which a resistor is connected in series with one of the amplifier inputs to increase the input impedance of the amplifier so that it does not affect the time constants of the differentiating circuits.

16. An electrical circuit according to claim 13 in which a resistor and a diode are connected in series between the non-inverting input and the output of the amplifier to produce a bias so that the input signal has to exceed a predetermined value before the amplifier changes to the operative state.

* * * * *